US007894079B1

(12) United States Patent
Altendorf et al.

(10) Patent No.: US 7,894,079 B1
(45) Date of Patent: Feb. 22, 2011

(54) LINEAR DISPLACEMENT SENSOR USING A POSITION SENSITIVE PHOTODETECTOR

(75) Inventors: Eric H. Altendorf, Everett, WA (US); Michael Nahum, Kirkland, WA (US)

(73) Assignee: Mitutoyo Corporation, Kawasaki-shi (JP)

(*) Notice: Subject to any disclaimer, the term of this patent is extended or adjusted under 35 U.S.C. 154(b) by 0 days.

(21) Appl. No.: 12/615,201

(22) Filed: Nov. 9, 2009

(51) Int. Cl.
    *G01B 11/14* (2006.01)
(52) U.S. Cl. ...................................... 356/614; 356/622
(58) Field of Classification Search ......... 356/614–623; 33/561, 520; 250/231.1
See application file for complete search history.

(56) References Cited

U.S. PATENT DOCUMENTS

| 4,120,093 | A |   | 10/1978 | Spies |   |
|---|---|---|---|---|---|
| 4,338,722 | A |   | 7/1982 | Delmas |   |
| 4,812,635 | A |   | 3/1989 | Kaufmann |   |
| 4,827,436 | A | * | 5/1989 | Sabersky et al. | 250/559.36 |
| 4,938,062 | A | * | 7/1990 | Shimizu et al. | 73/386 |
| 7,122,818 | B2 |   | 10/2006 | Kitamura |   |
| 7,526,967 | B2 |   | 5/2009 | Glueck |   |
| 2007/0010714 | A1 | * | 1/2007 | Negishi | 600/180 |

\* cited by examiner

*Primary Examiner*—Hoa Q Pham
(74) *Attorney, Agent, or Firm*—Christensen O'Connor Johnson Kindness PLLC

(57) ABSTRACT

A position sensing device comprises a light source that radiates diffuse source light along an optical axis direction to a detector, and a moving aperture arrangement positioned between the source and detector, to move perpendicular to the optical axis direction. The moving aperture arrangement comprises first and second limiting apertures, which angularly filter and transmit the diffuse source light to form a measurement spot on the detector. At least one signal output by the detector is indicative of a position of the movable member along a measurement axis. The angular intensity distribution of the angularly filtered rays of light which form the measurement spot is more consistent as a function of position along the measurement axis than the angular intensity distribution of the source light. The resulting consistent intensity distribution within the measurement spot throughout the measurement range enhances measurement linearity and accuracy.

20 Claims, 6 Drawing Sheets

LINEAR DISPLACEMENT SENSOR USING A POSITION SENSITIVE PHOTODETECTOR

FIELD OF THE INVENTION

The present invention relates to linear displacement sensors, and more particularly, to a linear displacement configuration that generates desirable measurement signals using a position sensitive photodetector.

BACKGROUND OF THE INVENTION

Various displacement sensors are known that provide signals which are indicative of a position using a linear variable differential transformer (LVDT). This type of system uses a primary solenoidal coil which generates an induced current in two secondary solenoidal coils, and the magnitude of the current in each secondary coil depends on the position of a ferromagnetic core that moves axially inside the coils. When the secondary coils are connected in reverse series, the position of the ferromagnetic core may be determined based on a resulting differential signal.

In some applications, it is desirable to provide an optical displacement sensor which provides a linear displacement signal, in a manner analogous to that of LVDT-type sensors. One prior art system of this type is disclosed in U.S. Pat. No. 4,338,722 (the '722 patent) issued to Delmas. The '722 patent discloses a sensor with a light source, a detector comprising two photoreceiver detectors and a moving stem with an opening to transmit light from the light source to the detectors. The moving stem slides between two guides. A cover over the opening on the moving stem is designed to be substantially symmetrical with the contact tip at the stem end relative to the center point between the two guides, as a means of eliminating measurement sensitivity to mechanical play of the stem. However, the '722 patent fails to recognize certain errors that may be associated with the light source. Thus, the device of the '722 patent may suffer from undesirable signal nonlinearity and/or accuracy errors.

A superior light source configuration is disclosed in U.S. Pat. No. 4,812,635 (the '635 patent), issued to Kaufmann et al., which provides a means for homogenous illumination in a position sensing device. The device of the '635 patent includes a light source, two photodiodes and a moving diaphragm which contains an aperture. The two photodiodes produce a signal determined by the position of the light which passes to them from the light source through the aperture on the diaphragm. The means for homogenous illumination comprises a correction filter along the optical path, which in the preferred embodiment comprises a film negative exposed using the light source at its nominal spacing. Such a custom filter outputs illumination which nominally has a uniform intensity. However, although the '635 patent provides source light which is uniform in intensity along a measuring axis, certain other errors that may be associated with the light source remain unrecognized. Thus, like the '635 patent, the device of the '722 patent may also suffer from undesirable signal nonlinearity and/or accuracy errors.

A simple optical position sensing device which provides improved linearity and/or accuracy (e.g., relative to the devices of the '635 and '722 patents) would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Briefly stated, the prior art for optical position sensing devices such as those outlined above does not adequately consider variations in the angular intensity distribution of light from the light source. In such devices, the moving aperture moves linearly across the field of illumination in order to move the spot along the detector. However, the aperture also moves to different angles relative to the light source emitter (s). Thus, at different positions along the measuring axis, rays from different sets of angles pass through the aperture to the photodetector in devices such as those disclosed in the '635 and '722 patents. This angular variation of the detected rays may generally mean that the position of the detected light spot is not simply linearly related to the position of the aperture along the measuring axis. In addition, when the source light has a non-uniform angular intensity distribution, the distribution of light within the detected light spot will have a corresponding non-uniformity that varies depending on the position of the aperture along the measuring axis. As a result, the detected centroid of the measurement spot may vary non-linearly within the spot boundary as a function of position. These effects have introduced undesirable errors in prior art devices, limiting their signal linearity and accuracy.

A position sensing device according to the present invention avoids the foregoing problems by providing a novel combination of a light source configuration and an aperture configuration arranged such that the measurement spot is formed by an angular intensity distribution of light which is consistent over the measuring range. In addition, the device may be configured to optimize the amount of light gathered in the measurement spot while minimizing the size of the measurement spot on the detector, further enhancing the linearity and accuracy of the device.

In various embodiments, the position sensing device comprises a diffuse light source, a position sensitive photodetector (also referred to simply as a detector), and a moving aperture arrangement. The diffuse light source is configured to radiate diffuse source light generally along an optical axis direction OA. The position sensitive photodetector is fixed relative to the diffuse light source and is aligned with its sensing surface opposing the diffuse light source and approximately normal to the optical axis direction OA, and with its sensing axis approximately aligned with the measuring axis. The moving aperture arrangement is located between the diffuse light source and the position sensitive photodetector, and is attached to a movable member which is guided linearly over a measuring range along a measuring axis direction which is transverse with the optical axis direction OA. The moving aperture arrangement is configured to receive the diffuse source light and output a portion of the diffuse source light to form a measurement spot on the position sensitive photodetector, the sensed spot moving along the measuring axis direction corresponding to the position of the moving aperture arrangement along the measuring axis direction. The moving aperture arrangement comprises a first limiting aperture that inputs the diffuse source light having a dimension DP1 along the measuring axis direction and a second limiting aperture that inputs diffuse source light from the first limiting aperture and outputs it to form the measurement spot. The second limiting aperture has a dimension DP2 along the measuring axis direction, and the first and second limiting apertures are spaced a distance LP from each other along the optical axis direction, wherein LP is at least 2 times the smaller of DP1 and DP2. In this way, the aperture arrangement angularly filters the diffuse source light such that the measurement spot always consists of rays within a filtered angular range that is less than an unfiltered angular range of rays included in the diffuse source light. An angular intensity distribution of the rays within the filtered angular range is more consistent as a function of position within the measuring range than the intensity distribution of the rays included in the unfiltered angular range as a function of position within the measuring range. The position sensitive photodetector outputs at least one signal that depends on the position of the measurement spot, and the at least one signal is indicative of the position of the movable member along the measuring axis direction. In some embodiments, the position sensitive photodetector outputs two differential signals that depend on the position of the measurement spot, and a relationship between the two signals is indicative of the position of the movable member along the measuring axis direction.

In various embodiments, the measuring range spans a dimension MR along the measuring axis direction, and the measuring spot is formed by of rays originating from a portion of the diffuse light source spanning a light contribution dimension DLS along the measuring axis direction. In some embodiments, it may be advantageous if the dimension DLS is greater than 0.5 times the dimension MR, or 1.0 times the dimension MR, or more in some embodiments. Alternatively, in some embodiments, the light contribution dimension DLS has a value of at least 2*DP2, or 4*DP2, or more in some embodiments. When the dimension DLS is larger, more light is concentrated into measuring spot, which helps maximize the signal and minimize intensity variations within the measurement spot 130 as a function of measurement position.

In some embodiments, the position sensing device may further comprise a lens positioned proximate to the second limiting aperture. The lens may be configured to image the diffuse source light present at the plane of the first limiting aperture and transmit it onto the detector in a more compact measurement spot than would be obtained in the absence of the lens. In some embodiments, the lens may be located between the second limiting aperture and the detector, to receive light from the second limiting aperture and transmit it to form the compact measurement spot on the detector. In some embodiments, the focusing lens may be located between the first and second limiting apertures, spaced apart from the first limiting aperture, to receive light from the first limiting aperture and transmit it through the second limiting aperture to form the compact measurement spot on the detector. In one embodiment, the focusing lens may comprise a half ball lens oriented with its flat surface toward the detector. In some embodiments, the lens may comprise a sapphire material, or other high index material.

In some embodiments, the first and second limiting apertures comprise circular apertures. In other embodiments, the first and/or second limiting apertures may comprise slit apertures having long dimensions perpendicular to the measuring axis direction that are longer than their dimension along the measuring axis direction. In some such embodiments, a focusing lens may comprise a rod lens (e.g., a half-cylinder lens) having a long axis perpendicular to the measuring axis direction.

In various embodiments, the diffuse light source comprises at least a light generating portion (e.g., and LED, or an OLED, or the like). The diffuse light source may be configured to radiate the diffuse source light along a light source range which spans a dimension LSR along the measuring axis direction at a plane of the diffuse light source, wherein the dimension LSR is larger than the measuring range MR. In various embodiments, the dimension LSR may be larger than the measuring range MR by at least the amount of the light contribution dimension DLS.

In some embodiments, the diffuse light source comprises a diffuser arranged to receive generated light from a fixed light generating portion and radiate the diffuse source light to the moving aperture arrangement. In some embodiments, the diffuser may comprise one of a Lambertian diffuser and a diffuser that diffuses light over a more limited angular range (e.g., a holographic diffuser). In one embodiment the diffuser may be fixed relative to the light generating portion and the fixed diffuser may radiate the diffuse source light everywhere along a diffuse light source range which spans the dimension LSR along the measuring axis direction.

In another embodiment, the diffuser may be attached to and move with the moving aperture arrangement. The fixed light generating portion may generate light that spans the dimension LSR along the measuring axis direction at a plane of the moving diffuser (e.g., the generated light may diverge to span the dimension LSR). The moving diffuser may receive the generated light at various positions in the light source range LSR and radiate the diffuse source light to the moving aperture arrangement while moving with it.

In another embodiment, the light generating portion may comprises a light-emitting material (e.g., OLED material) that directly radiates the diffuse source light from a light-emitting surface distributed everywhere along a light source range which spans the dimension LSR along the measuring axis direction.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
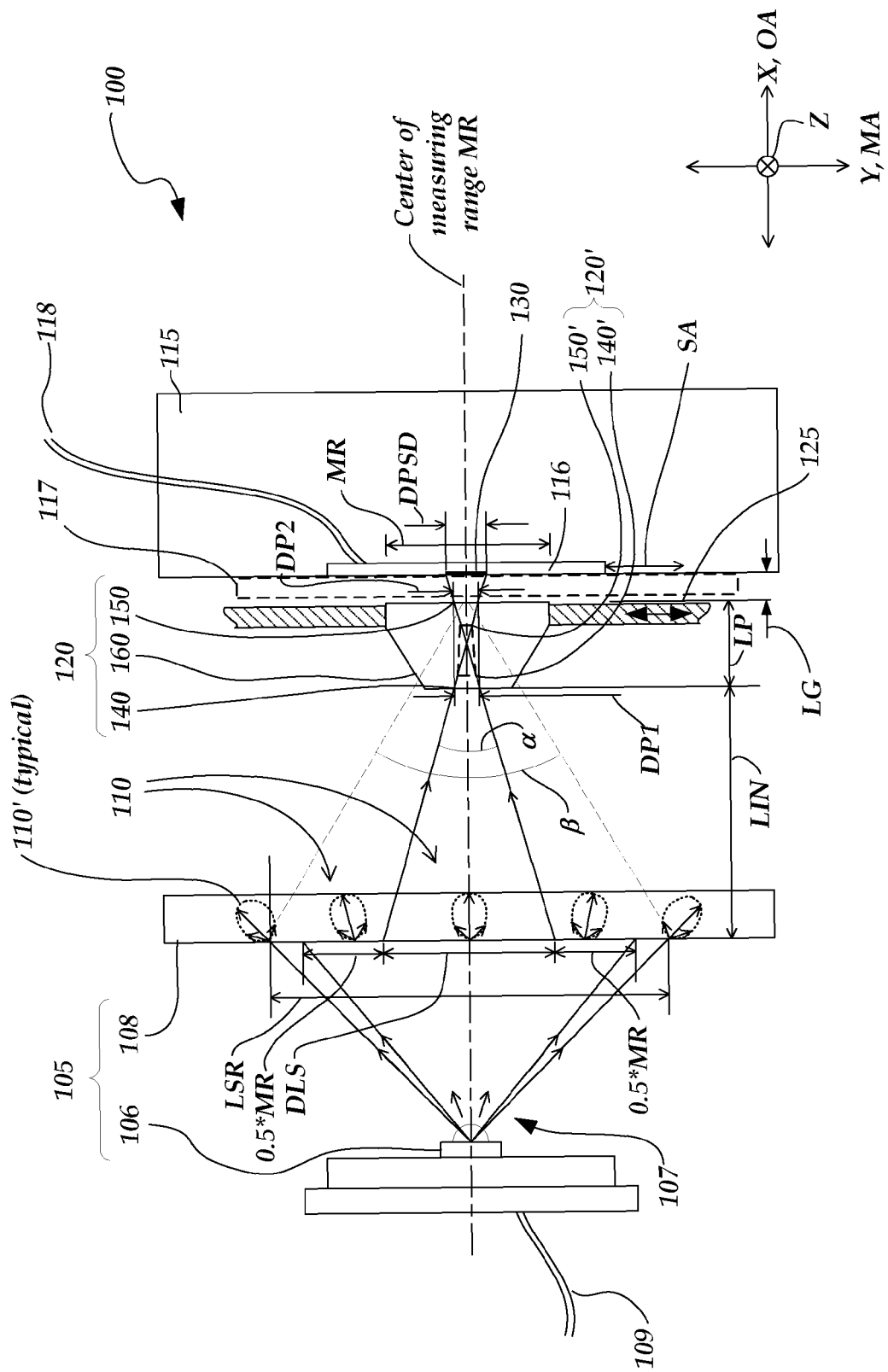
FIG. 1 is a diagram of a schematic cross-sectional view perpendicular to the measuring axis direction, for a first embodiment of a position sensing device according to the invention.

FIG. 1 is a diagram of a schematic cross-sectional view perpendicular to the measuring axis direction MA of a first embodiment of a position sensing device 100 according to the present invention. FIG. 1 shows a measuring axis direction MA indicated as a Y axis direction, and an optical axis direction OA indicated as an X axis direction defined to be perpendicular to the Y-Z plane, which is defined to be parallel to the plane of the sensing surface 116. The position sensing device 100 comprises a diffuse light source 105, light source power line or lines 109, a position sensitive photodetector 115 comprising the sensing surface 116, signal line or lines 118, a protective window 117 (optional), and a moving aperture arrangement 120 located between the diffuse light source 105 and the position sensitive photodetector 115.

The position sensitive photodetector (or detector) 115 is fixed relative to the diffuse light source 105 and aligned with its sensing surface 116 opposing the diffuse light source 105 and approximately normal to the optical axis direction OA. The moving aperture arrangement 120 is located between the diffuse light source 105 and the position sensitive photodetector 115, and is attached to a movable member 125 which is guided linearly along the measuring axis direction MA which is transverse with the optical axis direction OA. The moving aperture arrangement 120 comprises a first limiting aperture 140 having a dimension DP1 along the measuring axis direction MA and a second limiting aperture 150 having a dimension DP2 along the measuring axis direction MA. The first and second limiting apertures are aligned along the optical axis direction OA, and separated along that direction by a dimension LP. The first and second limiting apertures 140 and 150 may be configured in an aperture body 160, or by an assembly of separate parts (not shown), or the like.

In operation, the diffuse light source 105 is configured to radiate diffuse source light 110 generally along the optical axis direction OA. The moving aperture arrangement 120 receives the diffuse source light 110 and outputs a portion of the diffuse source light to form a measurement spot 130 on the sensing surface 116 of the position sensitive detector 115. The measurement spot 130 moves along the measuring axis direction MA over the measuring range MR on the detector 115, corresponding to the position of the moving aperture arrangement 120. The detector 115 outputs at least one signal through signal line(s) 118 that depends on the position of the measurement spot 130 along the measuring axis direction MA. In various embodiments, it is advantageous if two differential signals are output, and a relationship between the two signals is indicative of the position of the movable member 125 along the measuring axis direction MA. For example, in one embodiment, the position may be indicated by the relationship (A−B)/(A+B), where A and B are the differential signals. Such a relationship tends to be relative insensitive to variations in the average power in the measuring spot 130.

Regarding the moving aperture arrangement 120, the first limiting aperture 140 inputs the diffuse source light 110 and the second limiting aperture 150 inputs a portion of that diffuse source light 110 from the first limiting aperture 140 and outputs it to form the measurement spot 130. Because the first and second limiting apertures 140 and 150 are spaced a distance LP from each other along the optical axis direction OA, the moving aperture arrangement 120 angularly filters the diffuse source light 110 such that the measurement spot 130 is limited in size and furthermore always consists of rays within a filtered angular range α that is less than an unfiltered angular range β of rays included in the diffuse source light that could otherwise be transmitted through a single limiting aperture. For most economical and practical light source designs, an angular intensity distribution of the rays within the filtered angular range angle α is more consistent as a function of position within the measuring range MR than the intensity distribution of the rays included in the unfiltered angular range angle β as a function of position within the measuring range MR, which improves the accuracy of the position sensing device 100, as described in greater detail below. In some exemplary embodiments, the distance LP between the first and second limiting apertures 140 and 150 is at least 2 times the smaller of their respective dimensions DP1 and DP2, in order to provide a desirable filtered angular range of rays in the measuring spot 130.

It will be appreciated that different aperture arrangements may be used to provide a desired angular filtering. For example, FIG. 1 shows an alternative aperture arrangement 120' in dashed outline, which comprises first and second spaced apart limiting apertures 140' and 150', respectively, which differ in size. It will be understood that the moving aperture arrangements illustrated herein are exemplary only, and not limiting.

In general, it is desirable for the spot size DPSD of the measuring spot 130 to be as compact as possible, at least along the measuring axis direction. This has a number of benefits—for example, it may reduce the measurement sensitivity to the intensity distribution of light within the measurement spot, and may generally increase the signal-to-noise ratio and/or measurement resolution of the signals from the detector 115. For a given filtered angular range angle α provided by the moving aperture arrangement 120, reducing a detector gap distance LG between the second limiting aperture and the plane of the sensing surface 116 reduces the size of the measurement spot. Therefore, in various embodiments the detector gap distance LG may be chosen to be a practical minimum (e.g., in some embodiments, at most 0.5 millimeters, or 250 microns, or even 100 microns or less when no protective window 117 is used).

In some embodiments, the minimum detector gap distance LG may be regarded as a design constraint. It should be appreciated that for a given detector gap distance LG, the ratio of the spot size DPSD to the aperture dimension DP2 increases non-linearly as the distance LP between the first and second limiting apertures 140 and 150 decreases. This non-linear increase in spot size DPSD is particularly strong when LP/LG is less than 1.0. Therefore, in various embodiments, the distances LP and/or LG may be chosen such that LP/LG is at least 1.0, or more preferably at least 2.0, or 3.0 or more in some embodiments.

Regarding other design considerations, the light contribution dimension DLS is defined as the dimension at a plane of origination of the diffuse source light 110 (e.g., a ground glass surface) which contributes rays or energy to the measurement spot 130. In general, in terms of power conservation, signal to noise ratio, and/or averaging of potential light source non-uniformities, it is generally desirable that the light contribution dimension DLS is as large as possible (with due regard to tradeoffs between compactness and various other design considerations described herein). For a given filtered angular range angle α provided by the moving aperture arrangement 120, increasing a source gap dimension LIN between the plane of origination of the diffuse source light 110 and the first limiting aperture 140 is advantageous increases the size of the light contribution dimension DLS. Therefore, in various embodiments the source gap dimension LIN may be chosen to be a practical maximum.

In some embodiments, the total source to detector distance (LIN+LP+LG) may be regarded as a design constraint. Therefore, in some embodiments it may be advantageous if the distance LIN is at least as large as LP, or 1.5*LP, or 2.0*LP or more in some embodiments, in order to gather and concentrate source light into a compact measurement spot 130. In some embodiments, the source gap dimension LIN may simply be made as large as practical (e.g., at least 500 microns, or 1 millimeter, or 1.5 millimeters or more in some embodiments). In some embodiments, it may be advantageous if the dimension DLS is greater than 0.5 times the dimension MR, or 1.0 times the dimension MR, or more in some embodiments. Alternatively, in some embodiments, the light contribution dimension DLS has a value of at least 2*DP2, or 4*DP2, or more in some embodiments. When the dimension DLS is larger, more light is concentrated into measuring spot, which helps maximize the signal and minimize intensity variations within the measurement spot 130 as a function of measurement position.

Additional considerations related to the light contribution dimension DLS are described below with reference to FIG. 2A.

Regarding other design considerations, in general a diffuse light source according to this invention emits diffuse source light over a light source range or dimension LSR, defined along the measuring axis direction at the plane of origination of the diffuse source light. The light source range LSR is larger than the measuring range MR. In various embodiments, the light source range LSR is larger than the measuring range MR by at least the amount of the light contribution dimension DLS, as shown in FIG. 1 and described in greater detail with reference to FIGS. 2A and 2B. In the embodiment shown in FIG. 1, the diffuse light source 105 includes a light generating portion comprising a fixed LED 106 (which may include a lens) which is powered through power lines 109 to generate diverging rays 107, and a diffuser 108. The diffuser 108 is positioned far enough away from the LED 106 such that the diverging rays 107 extend to a desirable light source range LSR. In operation, the LED 106 emits diverging rays of LED light 107 to the diffuser 108 (e.g., to a ground glass surface nearest the LED 106). The diffuser 108 scatters the rays of the LED light 107 to radiate the diffuse source light 110. In some embodiments, the diffuser 108 may comprise an approximately Lambertian diffuser (e.g., an opal glass diffuser) which may scatter light approximately as schematically indicated by the diffuse intensity distribution indicators 110' shown in FIG. 1. Other embodiments may use a more efficient diffuser that diffuses light with a more uniform intensity over an angular range that is more limited relative to the optical axis direction (e.g., a holographic diffuser). Efficient non-Lambertian diffusers are available, for example, from Techspec UV Fused Silica Ground Glass Diffusers manufactured by Edmund Optics Inc. of Barrington, N.J. It should be appreciated that the diffuse light source 105 configuration shown in FIG. 1 is exemplary only, and not limiting. For example, in some embodiments, the diffuse light source may include a light generating portion comprising an OLED or other light-emitting material that emits the diffuse source light 110 directly from a light-emitting surface that extends over the light source range LSR.

Figures 2A, 2B:
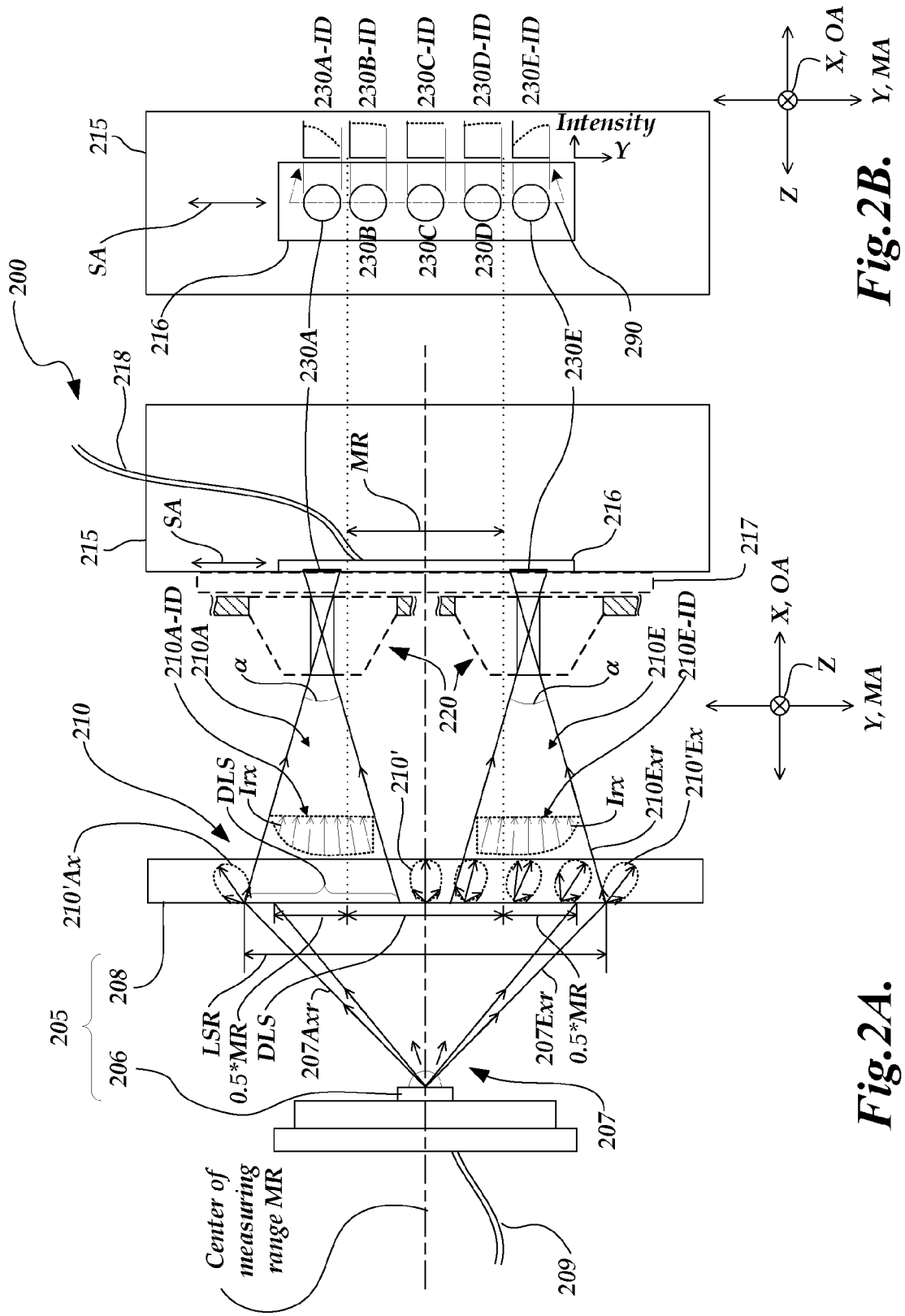
FIG. 2A is diagram of a schematic cross-sectional view perpendicular to the measuring axis direction for a position sensing device similar to the position sensing device of FIG. 1, illustrating design considerations with respect to two hypothetical positions for the moving aperture arrangement outside of a desirable measuring range.
FIG. 2B is a diagram schematically illustrating the intensity distribution in five hypothetical measurement spots, including the two measurement spots shown in FIG. 2A, as viewed on the surface of one exemplary detector usable in the embodiment shown in FIG. 2A.

FIGS. 2A and 2B are related diagrams having aligned X-Z planes, showing a position sensing device 200 and illustrating various design considerations related to maintaining a uniform intensity distribution in a measurement spot for all measurement positions within the measuring range MR. 2XX series numbers in FIGS. 2A and 2B that have the same "XX" suffix as 1XX series numbers in FIG. 1 may designate similar or identical elements unless otherwise indicated. Thus, the operation of the position sensing device 200 may generally be understood by analogy with FIG. 1, and only certain aspects of operation will be described here.

Regarding the measurement spot 230, because the moving aperture arrangement 220 uses previously outlined angular filtering principles, the angle of the rays forming the boundaries of the measuring spot 230 do not vary as a function of the measurement position (in contrast to prior art devices). As a result, parallax effects are eliminated and the boundaries of the measuring spot 230 translate precisely corresponding to the translation of the moving aperture arrangement 220. However, as previously outlined, the position sensitive photodetector 215 output signal(s) also depend on the intensity centroid of the measurement spot 230. Therefore, consistency of the intensity distribution along the sensitive axis SA of light within the measurement spot 230 is also important for providing measurement signals with good linearity and accuracy over the measuring range. Illustrative intensity distributions within the measurement spot are shown in FIG. 2B, described further below. Generally speaking, such an intensity distribution corresponds to the source light intensity distribution (along the direction of the sensitive axis SA) of light within the filtered angular range $\alpha$, for a particular measurement position. Some considerations that may determine source light intensity distributions at various measurement positions are shown in FIG. 2A.

FIG. 2A is diagram of a schematic cross-sectional view perpendicular to the measuring axis direction for the position sensing device 200, which is similar to the position sensing device of FIG. 1. In particular, FIG. 2A illustrates various design considerations with respect to two hypothetical positions (designated with reference number suffix elements A and E, respectively) of the moving aperture arrangement 220, corresponding to the position of the undesirable measuring spot instances (or measuring spots) 230A and 230E. For purposes of explaining how the present invention avoids potential problems present in prior art devices, and allows the use of a relatively compact and simple light source and detector, the two positions A and E correspond to positions outside of the desirable measuring range MR, to illustrate the potential problems in measurement spots that may occur at the extremes of the measuring range MR.

Briefly, the measuring spots 230A and 230E are undesirable because their intensity distributions are not uniform, which may arise due non-uniform intensity characteristics in the diffuse source light 210, as follows. As shown in FIG. 2A, the measuring spot 230E may receive a light ray 210Exr originating from an extreme LED light ray 207Exr. For example, the extreme LED light ray 207Exr may reach the diffusing surface of the diffuser 208, where it is scattered in an approximately Lambertian distribution that is biased away from the optical axis direction OA by an amount corresponding to its angle of incidence on the diffuser 208, approximately as illustrated by the extreme light ray intensity distribution indicator 210'Ex. The extreme light ray 210Exr is the resulting operation light ray, which falls within the filtered angular range $\alpha$ between the location of the extreme light ray intensity distribution indicator 210'Ex and the measurement spot 230E. The extreme light ray 210Exr has a low intensity, as indicated by the magnitude of its angular component in the intensity distribution indicator 210'Ex, and the intensity magnitude Irx of the corresponding component in the source light intensity distribution 210E-ID.

The source light intensity distribution 210E-ID also reflects the relative intensity for other source light rays which are distributed within the filtered angular range $\alpha$, and therefore reach the measurement spot 230E. The intensity indicated for the source light rays at other locations within the source light intensity distribution 210E-ID may be understood by analogy with the description above. Due to the symmetry of the configuration shown in FIG. 2A, the source light intensity distribution 210A-ID, corresponding to the position of the measurement spot 230A, will be a mirror image of the source light intensity distribution 210E-ID. The corresponding measurement spot intensity distributions 230A-ID and 230E-ID, respectively, are shown in FIG. 2B.

FIG. 2B is a diagram schematically illustrating the two undesirable measurement spots 230A and 230E, as well as three desirable measurement spots 230B, 230C, and 230D, on the sensing surface 216. Their corresponding intensity distributions 230A-ID through 230E-ID, as observed along the location of the dashed line 290 in the measurement spots 230A-230E, are schematically illustrated as projections parallel to the XZ plane.

As shown in FIG. 2B, the non-uniform source light intensity distributions 210A-ID and 210E-ID result in the non-uniform measurement spot intensity distributions 230A-ID through 230E-ID, and resulting detected intensity centroids would be significantly skewed (in opposite directions) relative to the measure spot boundaries. If the measuring range was expanded to include the positions A and E, the skewed intensity centroids would result in significant signal non-linearity and accuracy errors. In contrast, the measurement spots 230B, 230C, and 230D have relatively uniform measurement spot intensity distributions 230B-ID, 230C-ID and 230D-ID, because they do not receive the low intensity rays associated with extreme divergence angles of the generated LED light 207 and/or of the diffuse source light 210, as outlined above. Thus, the detected intensity centroids of measurement spots 230 corresponding to the measurement range MR are not significantly skewed relative to the spot boundaries, resulting in linear signals and good accuracy.

For practical applications requiring compact devices, the size of the diffuse light source 205 (e.g., its dimension along the optical axis direction OA, and along the direction of the light source range LSR) may be constrained to be small relative to the measuring range. It will be appreciated that given the constraints and design tradeoffs that must be satisfied in such applications, the angular filtering angle α provided by the moving aperture arrangement 220 plays a key role in providing a consistent intensity distribution in the measurement spot 230 throughout the measuring range, by excluding the low intensity rays associated with extreme divergence angles of the generated LED light 207 and/or of the diffuse source light 210, as well as other intensity discontinuities that may arise near the ends of the light source range LSR.

Figure 3:
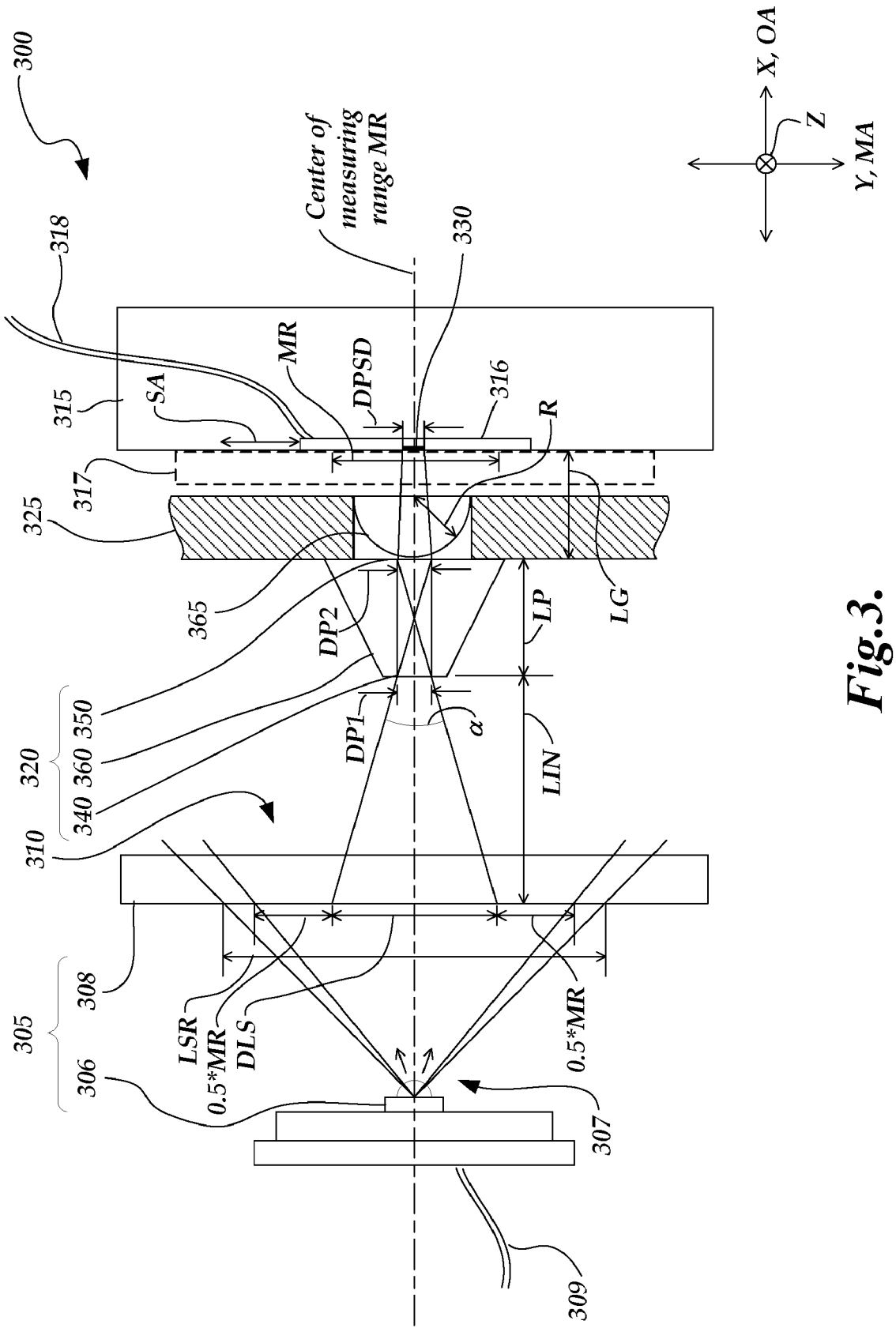
FIG. 3 is a diagram of a schematic cross-sectional view perpendicular to the measuring axis direction, for a second embodiment of a position sensing device according to the invention.
Figure 4:
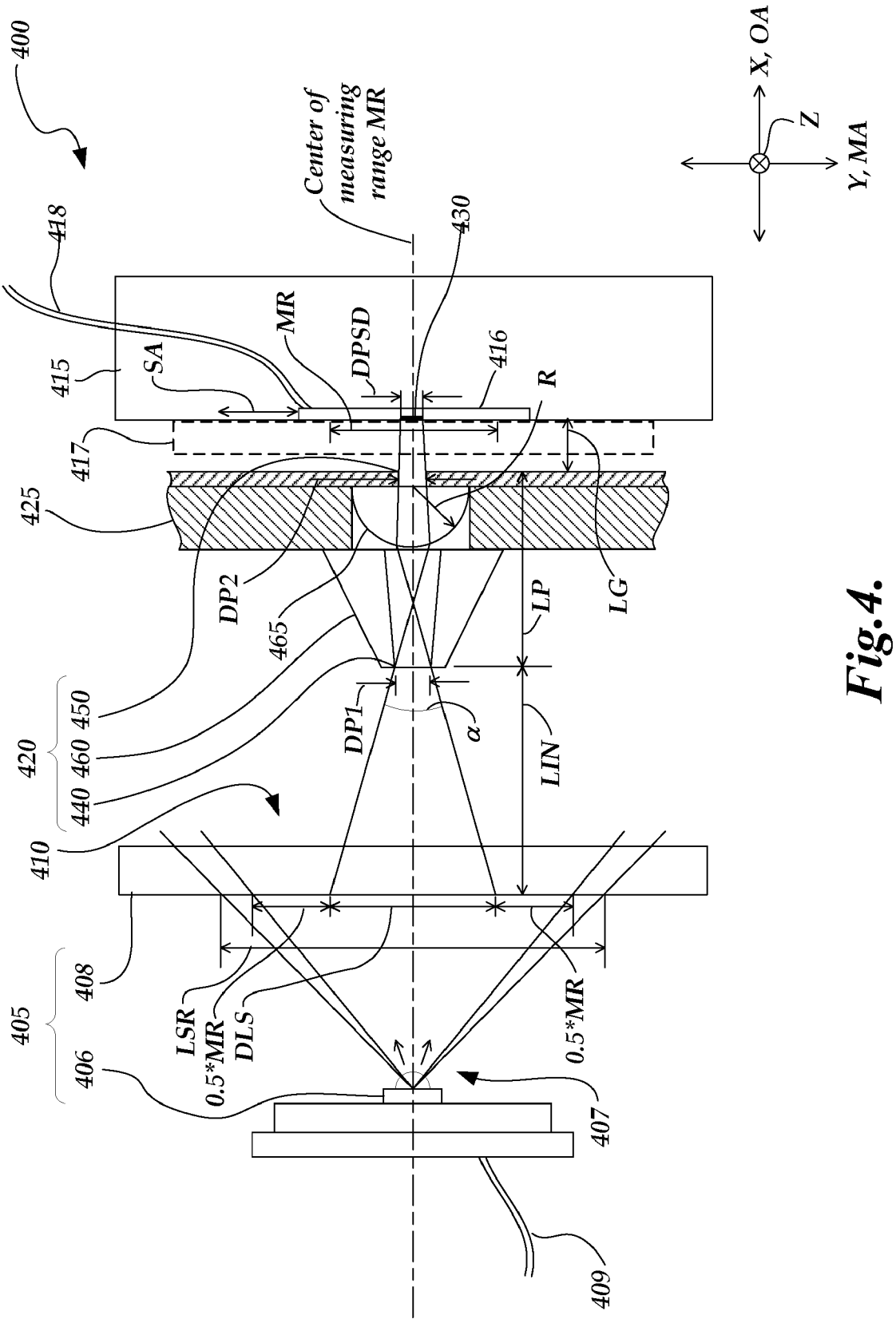
FIG. 4 is a diagram of a schematic cross-sectional view perpendicular to the measuring axis direction, for a third embodiment of a position sensing device according to the invention.
Figure 5:
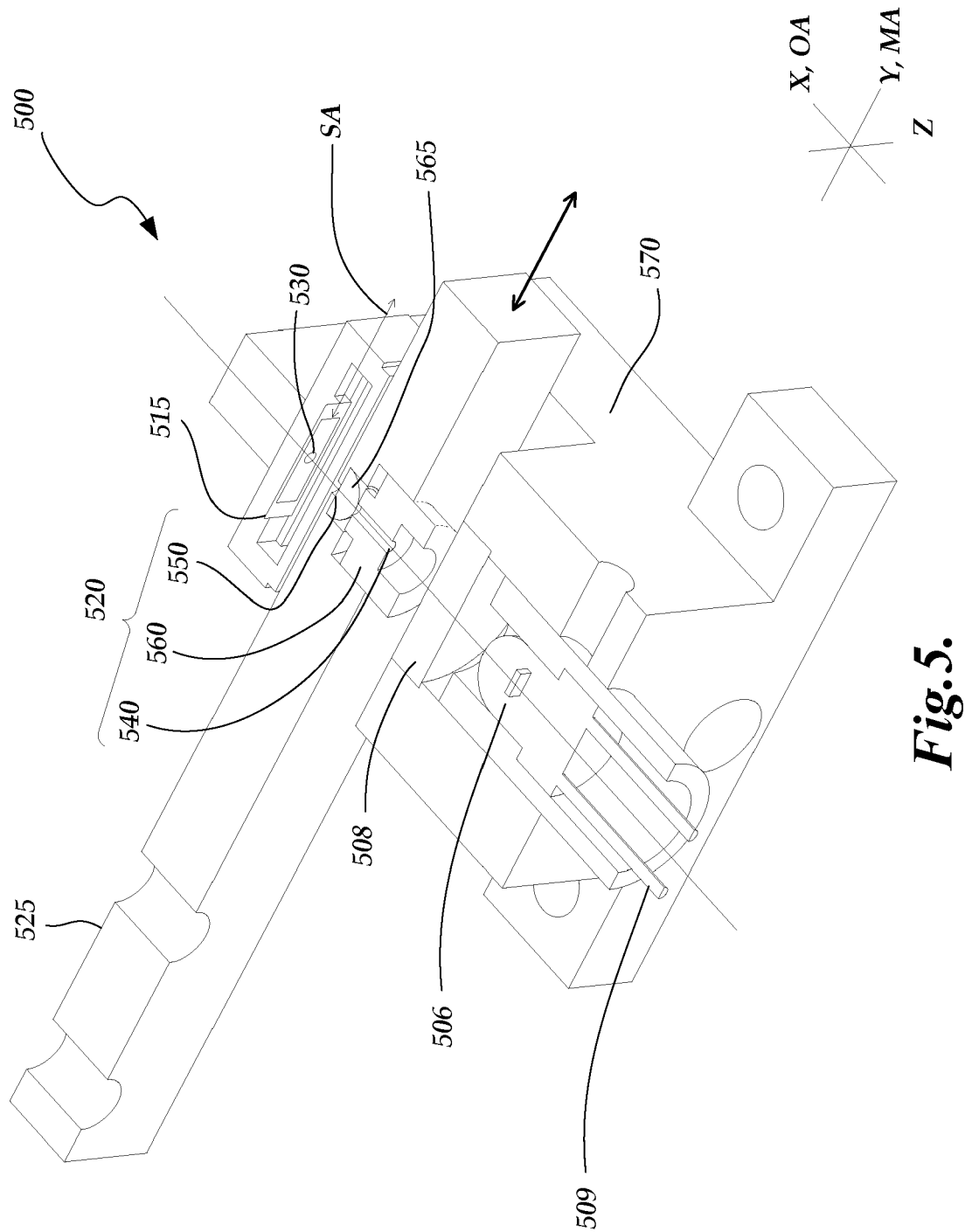
FIG. 5 is an isometric cut away view of one implementation of pieces for a gauge using a position sensing device similar to the position sensing device of FIG. 4.

Regarding FIGS. 3, 4 and 5, FIG. 3 is a diagram of a schematic cross-sectional view perpendicular to the measuring axis direction for a second embodiment of a position sensing device 300 according to the invention. FIG. 4 is a diagram of a schematic cross-sectional view perpendicular to the measuring axis direction for a third embodiment of a position sensing device 400 according to the invention. FIG. 5 is an isometric cut away view of a position sensing gauge 500, which is one implementation of a position sensing device similar to the position sensing device 400 of FIG. 4. The 3XX, 4XX and 5XX series numbers in FIGS. 3, 4 and 5 that have the same "XX" suffix may designate functionally similar or identical elements unless otherwise indicated. Furthermore, the 3XX, 4XX and 5XX series numbers that have the same "XX" suffix as 1XX series numbers in FIG. 1 may designate functionally similar or identical elements unless otherwise indicated. Thus, the operation of the position sensing device 300, the position sensing device 400 and the position sensing gauge 500 may generally be understood by analogy with previous descriptions, and only certain aspects of their operation will be described here.

Regarding FIG. 3, the primary difference between the position sensing device 300 and the position sensing devices 100 and 200 of FIGS. 1 and 2 is that position sensing device 300 further comprises a lens 365 located between the second limiting aperture 350 and the position sensitive detector 315. In general, the lens 365 receives angularly filtered light from the second limiting aperture 350 and transmits that light onto the sensing surface 316 in a more compact measurement spot 330 than would be obtained in the absence of the lens 365. In some embodiments, the lens 365 is configured to image the diffuse source light present at the plane of the first limiting aperture 340 onto the sensing surface 316. It will be appreciated that the lens 365 may allow a relatively large gap dimension LG to be used (between the second limiting aperture and the sensing surface 316), while still providing a compact measurement spot 330. This is particularly useful when the protective window 317 is used, because the protective window 317 demands the use of a relatively large gap dimension LG. In the embodiment illustrated in FIG. 3, the lens 365 comprises a half ball lens with a radius R and a refractive index n, which provides a focal length, where $f=R/(n-1)$. The optimal lens design and positioning to achieve the most compact measurement spot 330 may deviate somewhat from that expected in the case of ideal imaging, as may be established by analysis or experiment. It may be appreciated that in order to minimize spot size DPSD using a small gap dimension LG (for a compact design) requires a short focal length. Thus, it is advantageous for the lens 365 to have a relatively high value for the index of refraction n (e.g., the index of refraction n is at least 1.6), or a small value of the radius R, or both. An embodiment of the lens 365 with a small value of the radius R will be subject to more optical aberrations than an embodiment of the lens 365 with a larger value of the radius R. Thus, for the same focal length, an embodiment of the lens 365 with a higher index of refraction n may have a higher optical quality than an embodiment of the lens 365 with a smaller index of refraction n. Therefore, in some embodiments, the lens 365 comprises a sapphire material, or other high index material. A sapphire lens may be advantageous because it has a higher index of refraction (n=1.76) than common optical glass N-BK7 (n=1.51).

FIG. 4 shows a position sensing device 400 that comprises a lens 465, to provide advantages similar to those outlined above with reference to FIG. 3. The primary difference between the position sensing device 400 and the position sensing device 300 is that the lens 465 is positioned between the first limiting aperture 440 and the second limiting aperture 450, and spaced apart from the first limiting aperture along the optical axis direction OA. The lens 465 receives light from the first limiting aperture and transmits it through the second limiting aperture to form a compact measurement spot 430 on the sensing surface 316. Otherwise, in various embodiments, it may be advantageous to configure the lens 465 as previously described for the lens 365 of FIG. 3. It will be appreciated that in the configuration of FIG. 4, the first and second limiting apertures 440 and 450 may still be configured to provide angularly filtered light in the measurement spot 430, according to previously outlined principles, by taking into account the ray deflection provided by the lens 465. In some embodiments, the separate aperture located between the lens 465 and the detector 415 may be omitted, and the dimension of the lens 465 may be considered to provide the second limiting aperture that defines the filtered angular range angle α.

FIG. 5 is an isometric cut away view of a position sensing gauge 500, which is one practical implementation of a position sensing device similar to the position sensing device 400 that is represented schematically in FIG. 4. As shown in FIG. 5, the position sensing gauge 500 additionally comprises a mounting element 570. The LED source 506, the diffuser 508 and the position sensitive photodetector 515 are all fixed relative to one another by mounting them to the mounting element 570. The mounting element 570 may also receive bearings or flexures (not shown) that guide the linear motion of the movable member 525 along the measuring axis direction MA. In the embodiment shown in FIG. 5, the second limiting aperture 550 is integrated into the structure of the movable member 525.

Figure 6:
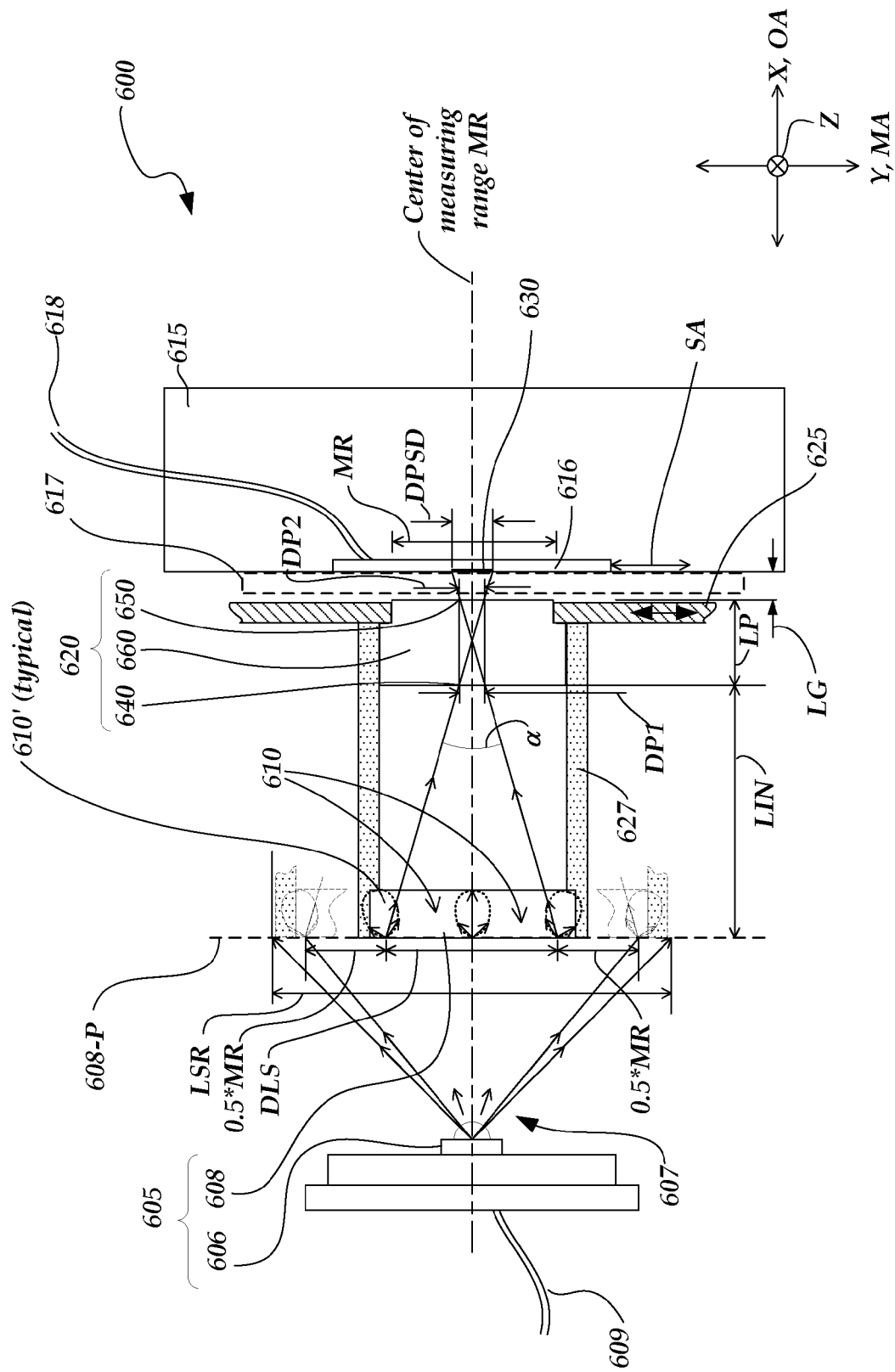
FIG. 6 is a diagram of a schematic cross-sectional view perpendicular to the measuring axis direction, for a fourth embodiment of a position sensing device according to the invention.

FIG. 6 is a diagram of a schematic cross-sectional view perpendicular to the measuring axis direction for a fourth embodiment of a position sensing device 600 according to the invention. The 6XX series numbers in FIG. 6 that have the same "XX" suffix as 1XX and 2XX series numbers in FIGS. 1 and 2 may designate functionally similar or identical elements unless otherwise indicated. Thus, the operation of the position sensing device 600 may generally be understood by analogy with previous descriptions, and only certain aspects of its operation will be described here.

Regarding FIG. 6, the primary difference between the position sensing device 600 and the position sensing devices 100 and 200 of FIGS. 1 and 2 is that the diffuse light source 605 comprises a moving diffuser 608, attached to the moving aperture arrangement 620 by a diffuser holder 627. A fixed light generating portion (e.g., the LED 606) may generate light 607 that spans the dimension LSR along the measuring axis direction MA at a plane 608-P of the moving diffuser 608. The moving diffuser 608 may receive the generated light 607 at various positions in the light source range LSR and radiate the diffuse source light 610 to the moving aperture arrangement 620 while moving with it. The moving aperture arrangement 620 provides angularly filtered light to the measurement spot 630, as previously outlined. It will be appreciated that the moving diffuser feature of the position sensing device 600 may be used in combination with various other features described with reference to FIGS. 1-5 (e.g., various dimensional relationships, lens arrangements, etc.). Furthermore, in some embodiments, at least the moving diffuser 608 of the diffuse light source 605 may be positioned closer to the moving aperture arrangement 620 along the optical axis direction OA than is illustrated in FIG. 6, such that the size of at least the moving diffuser 608 may reduced. Thus, it will be appreciated that the configuration shown in FIG. 6 is exemplary only, and not limiting.

It should be appreciated that although circular first and second limiting apertures have been shown or implied in the embodiments outlined above, in various other embodiments it is allowable for one, or both, of the first and second limiting apertures to be somewhat elongated along an axis perpendicular to the measuring axis direction, in order to pass additional light to the detector and increase the signal strength of the device. In such an embodiment that uses a lens (e.g., analogous to the use of lenses 365 and 465), the lens may comprise a lens elongated along the same direction as the elongated aperture(s) (e.g., a rod lens, or a half-cylinder lens).

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A position sensing device comprising:
   a diffuse light source configured to radiate diffuse source light along an optical axis direction OA, the diffuse light source comprising at least a light generating portion;
   a position sensitive detector which is fixed relative to the light generating portion and aligned with its sensing surface opposing the diffuse light source and approximately normal to the optical axis direction OA, and with its sensing axis approximately aligned with the measuring axis; and
   a moving aperture arrangement located between the diffuse light source and the position sensitive detector, and attached to a movable member which is guided linearly over a measuring range that spans a dimension MR along a measuring axis direction which is transverse with the optical axis direction OA, the moving aperture arrangement configured to receive the diffuse source light and output a portion of the diffuse source light to form a measurement spot on the position sensitive detector, the sensed spot moving along the measuring axis direction corresponding to the position of the moving aperture arrangement along the measuring axis direction,
   wherein the position sensing device is configured such that:
      the moving aperture arrangement comprises a first limiting aperture having a dimension DP1 along the measuring axis direction and a second limiting aperture having a dimension DP2 along the measuring axis direction, wherein the first and second limiting apertures are spaced a distance LP from each other along the optical axis direction OA with the second limiting aperture closer to the position sensitive detector, and LP is at least 2 times the smaller of DP1 and DP2;
      the aperture arrangement angularly filters the diffuse source light such that the measurement spot consists of rays within a filtered angular range that is less than an unfiltered angular range of rays included in the diffuse source light, those rays originating from a portion of the diffuse light source spanning a light contribution dimension DLS along the measuring axis direction;
      an angular intensity distribution of the rays within the filtered angular range is more consistent as a function of position within the measuring range than the intensity distribution of the rays included in the unfiltered angular range as a function of position within the measuring range; and
      the position sensitive detector outputs at least one signal in response to the measurement spot, and the at least one signal is indicative of the position of the movable member along the measuring axis direction.

2. The position sensing device of claim 1, wherein the position sensing device is configured such that the light contribution dimension DLS is greater than 0.5 times the dimension MR.

3. The position sensing device of claim 1, wherein the position sensing device is configured such that the light contribution dimension DLS is at least 4*DP2.

4. The position sensing device of claim 1, wherein the diffuse light source comprises a diffuser arranged to receive generated light from the light generating portion and radiate the diffuse source light.

5. The position sensing device of claim 4, wherein the diffuser is fixed relative to the light generating portion and the position sensing device is configured such that:
the diffuser radiates the diffuse source light everywhere along a diffuse light source range which spans a dimension LSR along the measuring axis direction; and
the dimension LSR is larger than (MR+DLS).

6. The position sensing device of claim 4, wherein the position sensing device is configured such that the diffuser is attached to and moves with the moving aperture arrangement.

7. The position sensing device of claim 6, wherein the position sensing device is configured such that:
the generated light from the light generating portion spans a dimension LSR along the measuring axis direction at a plane of the diffuser; and
the dimension LSR is larger than (MR+DLS).

8. The position sensing device of claim 1, wherein the light generating portion comprises a light-emitting material that emits the diffuse source light from a light-emitting surface everywhere along a light source range which spans a dimension LSR along the measuring axis direction; and the position sensing device is configured such that the dimension LSR is larger than (MR+DLS).

9. The position sensing device of claim 1, wherein the position sensing device is configured such that a source gap dimension LIN between a plane of origination of the diffuse source light and the first limiting aperture is greater than the distance LP.

10. The position sensing device of claim 9, wherein the position sensing device is configured such that:
the second limiting aperture and a plane of the sensing surface are separated by a detector gap distance LG; and
the ratio LP/LG is at least 1.0.

11. The position sensing device of claim 10, wherein the position sensing device is configured such that the ratio LP/LG is at least 2.0.

12. The position sensing device of claim 1, further comprising a lens located between the second limiting aperture and the position sensitive detector, the lens configured to receive angularly filtered diffuse source light from the second limiting aperture and transmit that light onto the sensing surface to form a more compact measurement spot than would be obtained in the absence of the lens.

13. The position sensing device of claim 12, wherein the lens comprises a half ball lens arranged with the convex side of the lens facing toward the first limiting aperture and configured to image the diffuse source light present at a plane of the first limiting aperture onto the sensing surface.

14. The position sensing device of claim 12, wherein the lens comprises at least one of (a) a material having an index of refraction that is at least 1.6, and (b) a sapphire material.

15. The position sensing device of claim 12, wherein the position sensing device is configured such that:
at least one of the first and second limiting apertures is elongated along an axis perpendicular to the measuring axis direction; and
the lens comprises a lens elongated along the axis perpendicular to the measuring axis direction.

16. The position sensing device of claim 1, further comprising a lens located between the first and second limiting apertures, the lens being spaced apart from the first limiting aperture along the optical axis direction and configured to receive diffuse source light from the first limiting aperture and transmit that light through the second limiting aperture and onto the sensing surface to form a more compact measurement spot than would be obtained in the absence of the lens.

17. The position sensing device of claim 16, wherein the lens comprises a half ball lens arranged with the convex side of the lens facing toward the first limiting aperture and configured to image the diffuse source light present at a plane of the first limiting aperture onto the sensing surface.

18. The position sensing device of claim 16, wherein the lens comprises at least one of (a) a material having an index of refraction that is at least 1.6, and (b) a sapphire material.

19. The position sensing device of claim 16, wherein the position sensing device is configured such that:
at least one of the first and second limiting apertures is elongated along an axis perpendicular to the measuring axis direction; and
the lens comprises a lens elongated along the axis perpendicular to the measuring axis direction.

20. The position sensing device of claim 1, wherein the distance LP is at least as large as 2 times the larger of DP1 and DP2.

* * * * *